UNITED STATES PATENT OFFICE.

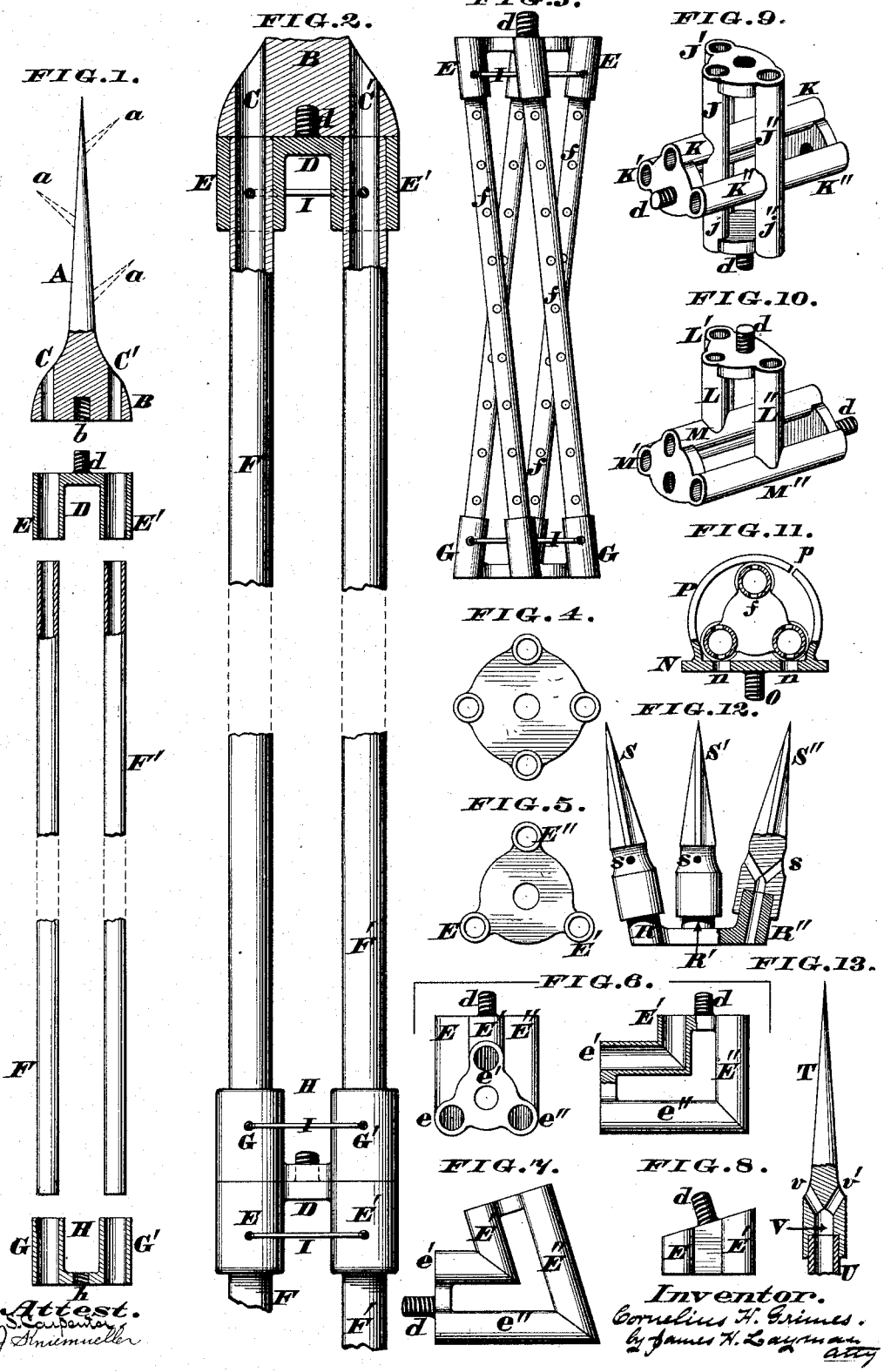

CORNELIUS H. GRIMES, OF GRATIS, OHIO.

LIGHTNING-ROD.

SPECIFICATION forming part of Letters Patent No. 356,531, dated January 25, 1887.

Application filed August 3, 1886. Serial No. 209,848. (No model.)

*To all whom it may concern:*

Be it known that I, CORNELIUS H. GRIMES, a citizen of the United States, residing at Gratis, in the county of Preble, State of Ohio, have invented certain new and useful Improvements in Lightning-Rods, of which the following is a specification, reference being had therein to the accompanying drawings.

This invention relates to those tubular lightning-rods which are surmounted with hollow or channeled points or arresters; and the first part of my improvements consists in uniting the various sections of such rods by hollow-socketed couplings, one of which has a screw-threaded shank that engages with a female thread of the other coupling. By this construction a straight, direct, and uninterrupted channel is afforded throughout the entire length of the rod for the circulation of air and the consequent evaporation of any moisture that may collect in the tubes, as hereinafter more fully described.

The second part of my improvements consists in arranging the hollow sockets of the male and female couplings at such an angle as will cause the tubular sections to have a long spiral or twisted shape, thereby affording a light but very stiff rod, as hereinafter more fully described.

In the annexed drawings, Figure 1 is an axial section showing the various members of a duplex lightning-rod separated from each other. Fig. 2 is an enlarged sectional elevation of a portion of the united rod. Fig. 3 is an elevation of a modified construction of the same, in which four rods are grouped together. Fig. 4 is a plan of a coupling to be used with these rods. Fig. 5 is a plan of a coupling to be adopted when three tubes are thus grouped together. Fig. 6 shows an end and side elevation of a coupling to be used when three grouped tubes are to make a right-angled bend or turn. Fig. 7 is a side elevation of a coupling to be used when three grouped tubes are to be arranged at an acute angle. Fig. 8 is a modification of an angle-coupling. Fig. 9 is a perspective view of a coupling having four separate sets of sockets for receiving as many tubes with three in a group, two sections of said sockets being horizontal and the other two being vertical. Fig. 10 is a perspective view of a coupling having one vertical and two horizontal sockets, said sockets being arranged in groups of three. Fig. 11 is an enlarged section of a clip-coupling surrounding a three-fold rod. Figs. 12 and 13 are modifications of the point.

A represents the point or arrester, which is made of any suitable conducting material, and may be provided with a series of branching tips, as indicated by the dotted lines *a a a*. This point has a base, B, tapped at *b*, to receive the screw or shank of the coupling upon which the point is mounted, said base being further provided with one or more channels, C C'.

D represents a coupling having a threaded shank, *d*, that engages with the screw *b* of the point when said point and coupling are properly united, which act causes the channels C C' to be in line with the hollow sockets E E', the latter being integral with said coupling, which, for the purpose of perspicuity, will be hereinafter designated as the "male coupling."

F F' represent sections of tubular rods of any convenient length, said rods being preferably of copper and of such diameter as to fit snugly within the sockets or holders E E'. Adapted to fit around the lower portions of these sections F F' are the hollow sockets or holders G G' of a female coupling, H, having a threaded aperture, *h*, to receive the shank of an adjacent coupling.

The above described devices constitute one joint or section of the rod when properly united together, which attachment is effected in the following manner: The point A is first screwed to the male coupling D, thereby bringing the channels C C' of the former in line with the hollow sockets E E' of the latter, after which the upper ends of the tubular rods F F' are inserted in said sockets and secured by a wire, I, as seen in Fig. 2. The sockets G G' of the female coupling H are then fitted to the lower ends of tubes F F' and secured in the same manner—that is to say, by a wire, I. Other sections are formed in the same manner, and are subsequently coupled together to afford a rod of any required length, which rod will have a continuous unbroken channel through it from the point B down into the ground; hence it is apparent that my rod has ample provision for allowing a free circulation of air throughout its entire length, whereby any moisture that may collect therein is speedily evaporated.

Figs. 3 and 4 show a modification of my invention in which four tubular rods are grouped together and arranged to form a long twist or spiral. Furthermore, Fig. 3 shows that the tubes may be perforated at suitable intervals, as at $f$, to facilitate the circulation of air.

Fig. 5 shows a coupling having three hollow sockets, E E' E'', for the reception of as many tubular rods, and in Fig. 6 three sockets have right-angled extensions $e\ e'\ e''$, thereby forming an elbow that allows the rod to make a square bend or turn; but in Fig. 7 the sockets E' E'' are inclined with reference to their extensions $e\ e'$, in order that the rod may be arranged at an acute angle when desired. This angular elbow may be arranged to receive either two, three, or more tubular rods, as desired.

Fig. 8 shows a coupling that may be used for joining a straight to an inclined rod, said coupling being composed of two or more sockets, E E', cut off obliquely at their upper ends and having the screw-shank $d$ perpendicular to said cut.

Fig. 9 shows three vertical sockets, J J' J'', having downward extensions $j\ j'''$, that intercept three horizontal sockets, K K' K''. This construction of sockets allows a pair of threefold vertical tubes and a pair of threefold horizontal tubes to be coupled together; or, in other words, twelve rods can be united by this device.

Fig. 10 shows three vertical sockets, L L' L'', joined to as many horizontal sockets, M M' M'', which arrangement permits nine tubes to be coupled together.

Fig. 11 shows a clip-coupling consisting of a plate, N, perforated at $n$ and having a screw-shank, O, to engage with a female coupling. Plate N has a band or clip, P, which can be separated at $p$, so as to be passed around a group of tubes and then be secured thereto. This coupling can be used for attaching a lateral or branch to a main rod without cutting the latter.

Fig. 12 shows a coupling provided with three hollow sockets, R R' R'', that support points S S' S'', the latter being channeled at $s$, to permit the circulation of air; but in Fig. 13 the point T is screwed or soldered directly upon the upper end of tubular rod U, thereby dispensing with a coupling at this place, and said point has a channel, V, formed by the junction of two branches, $v\ v'$, said channel V being in line with said tube.

Finally, it is evident the couplings herein described permit the rod being arranged to suit any peculiar shape of wall, tower, roof, or other structure and without in the least interfering with the flow of electricity. This is a great advantage over the ordinary tubular rods, as it is not possible to give them a short sudden bend without breaking or buckling the sections.

I claim as my invention—

1. The combination, in a lightning-rod, of two or more tubes, F F', secured parallel with each other by male couplings D, having hollow sockets E E' and a screw-threaded shank, $d$, and female couplings H, having hollow sockets G G', and a screw-threaded aperture, $h$, the upper section of the rod being surmounted by a point, A, having a pair of channels, C C', communicating with said tubes, whereby a straight and continuous passage is afforded through the rod, for the purpose described.

2. The combination, in a lightning-rod, of male and female couplings having hollow sockets arranged at such an angle as will impart a spiral or twisted shape to the various tubes inserted in said sockets, substantially as herein described.

In testimony whereof I affix my signature in presence of two witnesses.

CORNELIUS H. GRIMES.

Witnesses:
W. H. WYSONG,
CHAS. D. GRIMES.